Aug. 21, 1951     B. B. LEUSTIG     2,565,140

HEIGHT GAUGE

Filed Feb. 15, 1946

INVENTOR.
BENNO B. LEUSTIG

BY *Richey & Watts*

ATTORNEYS

Patented Aug. 21, 1951

2,565,140

UNITED STATES PATENT OFFICE 2,565,140

HEIGHT GAUGE

Benno B. Leustig, Cleveland, Ohio

Application February 15, 1946, Serial No. 647,802

11 Claims. (Cl. 33—170)

This invention relates broadly to gaging instruments and more specifically to an improved bench micrometer adapted for use either as a caliper or a height gage.

One of the objects of the invention is provide a micrometer caliper having a limit gage mounted in the work engaging member thereof, the instrument being designed for use as a snap gage in which the gaging member may be adjusted to the "go" or high limit of the specified tolerance of the work and the limit gage or secondary micrometer gaging member may be adjusted to the "no go" or low limit tolerance.

Another object of the invention is to provide a micrometer caliper in which the gaging anvil may be inverted to accommodate the use of the instrument as a height gage.

Another object of the invention is to provide a micrometer caliper having a work stop plate mounted therein which is adapted for adjustment within the range of tolerances customarily specified as the decimal limits to which work pieces are to be machined.

Another object of the invention is to provide a gage which is economic of manufacture, efficient of operation and susceptible of manipulation with greater ease than micrometer calipers of the portable type.

Other objects and advantages more or less ancillary to the foregoing and the manner in which all the various objects are realized will appear in the following description, which considered in connection with the accompanying drawings, sets forth the preferred embodiment of the invention.

Referring to the drawings.

Figure 1:
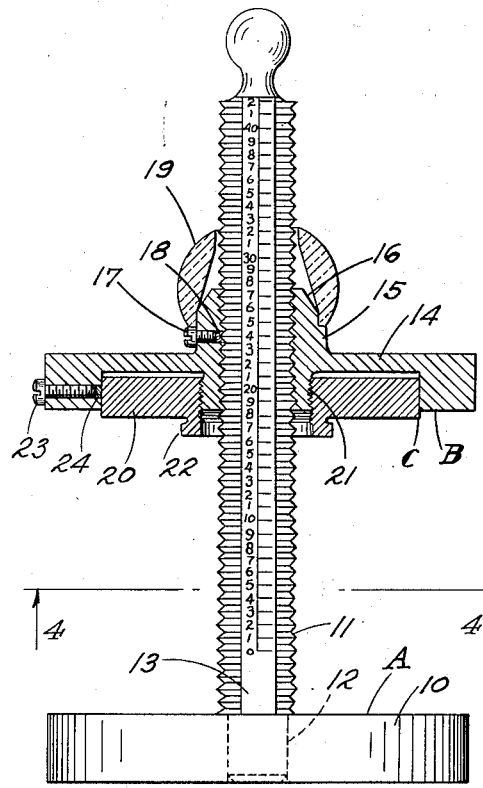
Fig. 1 is a vertical sectional view of the improved gage.

Referring first to Fig. 1, the gage comprises a base plate 10 bored for the reception of a post 11 which is formed with a screw thread of the pitch customarily used in micrometer calipers. The post is preferably formed with a reduced end portion 12 which is pressed or otherwise rigidly secured in an opening in the center portion of the base 10. The post is further machined with longitudinal flat areas 13 disposed in opposed relation with each other. The flat areas 13 are provided with graduations similar to those employed on the barrel of a micrometer caliper, the graduations or scale on one side of the post being spaced from the base of the gage a distance equal to the height of the gaging plate so that direct readings may be taken when the plate is inverted. The post 11 is provided with an annular plate 14 constituting the gaging anvil of the caliper. The plate is bored and threaded for engagement on the post and is further formed with a boss 15 having a beveled end portion 16 thereon which is graduated with radial lines similar to those on the sleeve of a micrometer caliper. The boss 15 is drilled and tapped for the reception of a set screw 17 for locking the plate in fixed relation with the post after the plate is adjusted to its gaging position. To avoid mutilation of the threaded post, a copper plug 18 may be interposed between the end of the set screw and the micrometer thread.

The boss 15 is machined for the support of a spheroidal lens 19 which is formed with a conical bore through the axis thereof. The transverse axis of the lens is disposed relative the graduations on the post and beveled face of the boss to effect the magnification thereof.

The face of the plate 14 opposite the boss 15 is bored for the reception of a ring 20 having a drilled and tapped opening therein for engagement with a micrometric thread 21 found in a hub of the plate 14. The ring is formed with a depending boss 22 which is knurled to accommodate adjustment thereof. The plate 14 is drilled and tapped for the reception of a set screw 23 adapted to lock the ring in fixed relation with the plate after proper adjustment thereof has been made. A copper plug 24 is interposed between the screw and ring 20 to prevent mutilation of the outer face thereof. The plate 14 is formed with a witness mark 25 which registers with a similar mark 26 on the ring 20 when the gaging face D of the ring is flush with the surface B of the plate 14. The ring is further provided with graduations 27 calibrated relative to the thread 21 in the ring 20 to read in thousandths of an inch. By way of illustration, if the work piece is specified as 3.500±.003 the ring may be adjusted to protrude .006 of an inch beyond the surface B of the plate 14 in order to obtain the "no go" reading of the limit gage. The plate may then be set to read 3.503 or the "go" limit of the specified tolerance for the work piece.

When the gage is assembled as illustrated in

Fig. 1 the plate 14 may be adjusted to the high limit of the dimension specified for the finished work piece and the ring 20 adjusted to the low limit of the specified tolerance. With the gage thus adjusted, the work piece may be inserted between the ground face A of the base plate 10 and the finished surface B of the plate 14. The work may then be moved inwardly towards the depending shoulder C defined by the edge of the ring 20. If the work is within the specified tolerances, shoulder C will arrest further movement thereof and indicate that the work has been machined within the specified tolerances.

Figure 2:
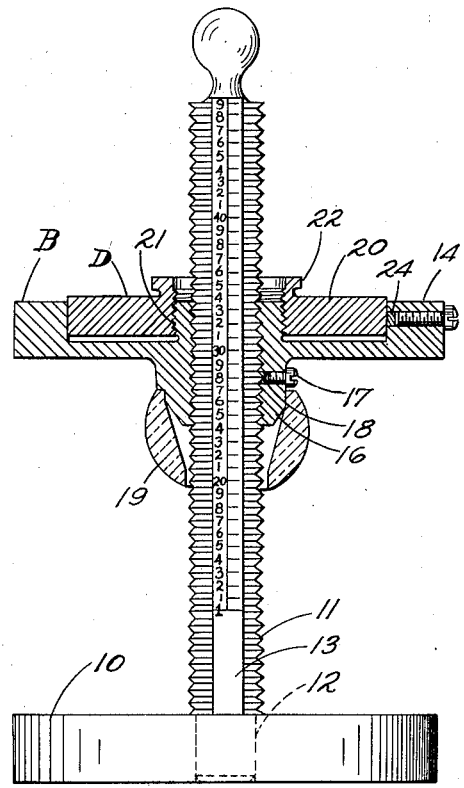
Fig. 2 is a similar vertical section illustrating the instrument adjusted for use as a height gage showing the scale on the opposite side of the micrometer screw.
Figures 3, 4:
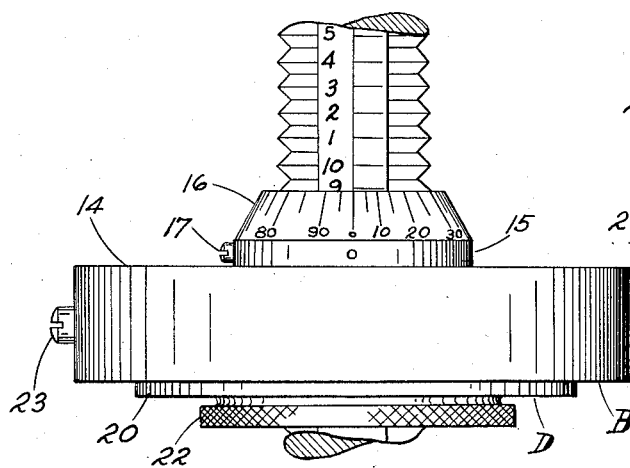
Fig. 3 is an enlarged detailed view of a fragmentary portion of the screw and gaging anvils.
Fig. 4 is a transverse section through the instrument, a section being taken on a plane indicated by the line 4—4 in Fig. 1.

When the instrument is used as a height gage, the plate 14 may be inverted as illustrated in Fig. 2 and readings may be taken from the surface plate upon which the instrument is mounted to the surface B of the gage or to the "no go" surface D of the ring. When the gage is used either as a snap or height gage, the set screws 17 and 23 may be locked to maintain the proper adjustment of the respective parts of the gage.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What I claim is:

1. A gage comprising a base, a micrometer screw thereon, graduations on said screw, a plate threaded on said screw, radial graduations thereon, a transparent sphere having a hole therethrough mounted on said plate, said screw being disposed within said hole, the radial graduations on said plate being disposed in a plane common to the transverse axis of said sphere.

2. A bench gage comprising a base, a micrometer screw thereon normal thereto, a plate threaded thereon constituting a gaging anvil, graduations on said plate, two scales on said screw, one of said scales indicating the height of the upper face of said plate above the lower face of the base, the other of said scales indicating the distance of the lower face of said plate from the upper face of the base, and a spheroidal lens having a hole therethrough to receive said screw mounted on said plate for magnifying the graduations on said plate and the scales on the screw.

3. A bench micrometer gage comprising a base constituting one of the gaging elements, a micrometer screw mounted on said base normal thereto, a plate constituting a second gaging element mounted on said screw, graduations on said screw, radial graduations on said plate and an axially bored transparent sphere on said plate circumambient said screw constituting a lens for magnifying said graduations.

4. A bench gage comprising a base formed with a first gaging surface, a column mounted on the base normal to the gaging surface and formed with a screw thread, a member movable on the column and engaging the thread, a second gaging surface on said member parallel to the first gaging surface, and a body threaded on the member for movement relative thereto normal to the gaging surfaces, the body being formed with a third gaging surface parallel to the other gaging surfaces movable from a plane coinciding with the second gaging surface.

5. A bench gage comprising a base formed with a first gaging surface, a column mounted on the base normal to the gaging surface and formed with a screw thread, a member movable on the column and engaging the thread, a second gaging surface on said member parallel to the first gaging surface, and a body threaded on the member for movement relative thereto normal to the gaging surfaces, the body being rotatable relative to the column and being formed with a third gaging surface parallel to the other gaging surfaces movable from a plane coinciding with the second gaging surface.

6. A bench gage comprising a base formed with a first gaging surface, a column mounted on the base normal to the gaging surface and formed with a micrometer thread and a longitudinal index line, a member movable on the column and engaging the thread, a second gaging surface on said member parallel to the first gaging surface and with micrometer graduations cooperating with the index line, a body threaded on the member for movement relative thereto normal to the gaging surfaces, the body being formed with a third gaging surface parallel to the other gaging surfaces movable from a plane coinciding with the second gaging surface, and micrometer graduations to indicate the relative displacement of the second and third gaging surfaces.

7. A bench gage comprising a base formed with a first gaging surface, a column mounted on the base normal to the gaging surface and formed with a micrometer thread and a longitudinal index line, a member movable on the column and engaging the thread, a second gaging surface on said member parallel to the first gaging surface and with mircrometer graduations cooperating with the index line, a body threaded on the member for movement relative thereto normal to the gaging surfaces, the body being rotatable relative to the column and being formed with a third gaging surface parallel to the other gaging surfaces movable from a plane coinciding with the second gaging surface, and micrometer graduations to indicate the relative displacement of the second and third gaging surfaces.

8. A bench gage comprising a base formed with a first gaging surface, a column mounted on the base, a member adjustable on the column, a second gaging surface on said member parallel to the first gaging surface, a body threaded on on the member for movement relative thereto normal to the gaging surfaces, the body being formed with a third gaging surface parallel to the other gaging surfaces movable relative to the second gaging surface independently of the movement of the second gaging surface relative to the first gaging surface, and micrometer graduations to indicate the relative displacement of the second and third gaging surfaces.

9. A bench gage comprising a screw, a first member fixed on the screw, a second member threaded on and rotatable on the screw for adjustment longitudinally thereof relative to the first member, a hub on the second member threaded on an axis parallel to the axis of the screw, and a third member threaded on and rotatable on the threaded hub for adjustment longitudinally of the screw relative to the other members, the third and first members being relatively rotatable, each member being formed with a gage surface normal to the axis of the screw, and micrometer graduations to indicate the distances between the gage surfaces.

10. A bench gage comprising a screw, a first member fixed on the screw, a second member threaded on and rotatable on the screw for adjustment longitudinally thereof relative to the first member, a hub on the second member threaded on an axis parallel to the axis of the screw, and a third member threaded on and rotatable on the threaded hub for adjustment longitudinally of the screw relative to the other members, the third and first members being relatively rotatable, each member being formed with a gage surface normal to the axis of the screw, and micrometer graduations to indicate the distances between the gage surfaces, the gage surfaces of the second and third members facing in the same direction and being adjustable into the same plane.

11. A bench gage comprising a screw, a first member fixed on the screw, a second member threaded on and rotatable on the screw for adjustment longitudinally thereof relative to the first member, a hub on the second member threaded on an axis parallel to the axis of the screw, and a third member threaded on and rotatable on the threaded hub for adjustment longitudinally of the screw relative to the other members, the third and first members being relatively rotatable, each member being formed with an annular gage surface normal to the axis of the screw, and micrometer graduations to indicate the distances between the gage surfaces, one of the said second and third members being received in a recess of the other of the second and third members so that the gage surfaces of the second and third members may be moved into a common plane.

BENNO B. LEUSTIG.

REFERENCES CITED

The following references are of record in the file of this patent:

UNITED STATES PATENTS

| Number | Name | Date |
|---|---|---|
| 1,149,383 | Meilicke | Aug. 10, 1915 |
| 2,011,945 | Mathi | Aug. 20, 1935 |
| 2,350,881 | Dickerman | June 6, 1944 |
| 2,385,874 | Metro | Oct. 2, 1945 |
| 2,388,252 | Crane | Nov. 6, 1945 |
| 2,399,160 | Betoche | Apr. 30, 1946 |

OTHER REFERENCES

Publication, American Machinist, Page 125, January 3, 1946.